April 30, 1940.                    D. D. HALL.                    2,198,727
ADVERTISING RACK FOR TAXICABS AND OTHER CONVEYANCES
                    Filed Oct. 21, 1939            2 Sheets-Sheet 1
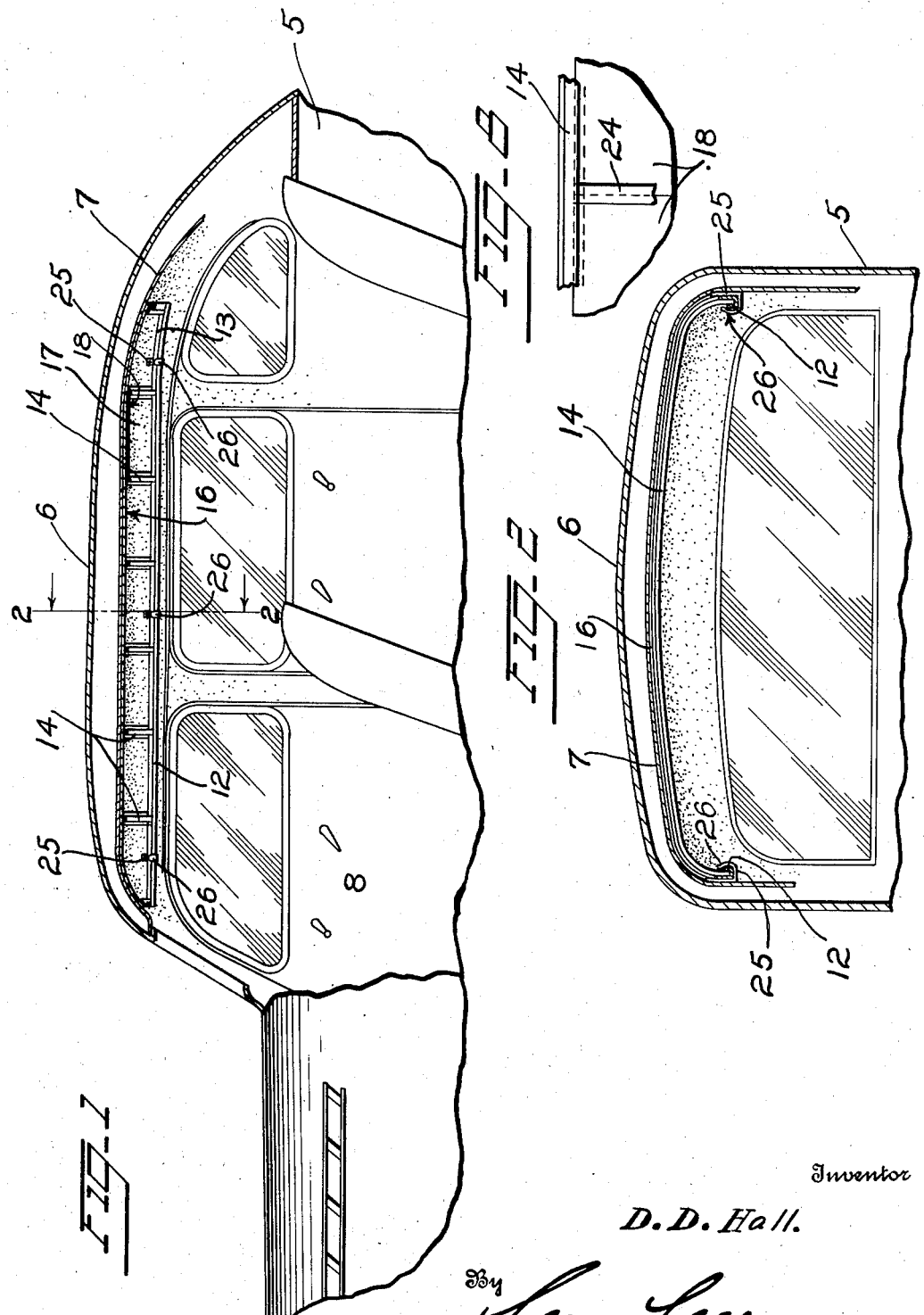
Inventor
D. D. Hall.
By Lacey & Lacey, Attorneys April 30, 1940. D. D. HALL 2,198,727
ADVERTISING RACK FOR TAXICABS AND OTHER CONVEYANCES
Filed Oct. 21, 1939 2 Sheets-Sheet 2
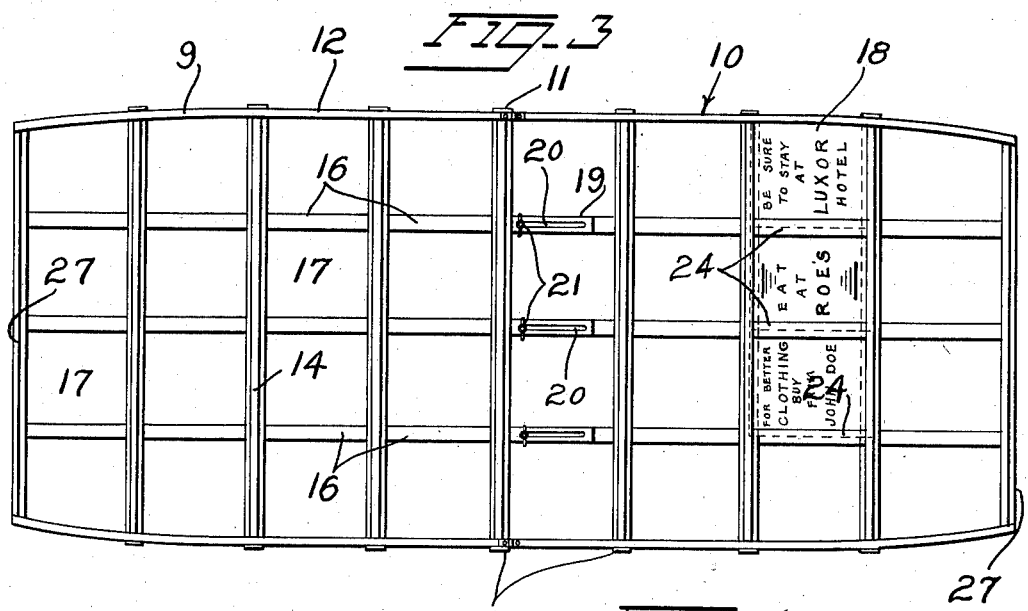
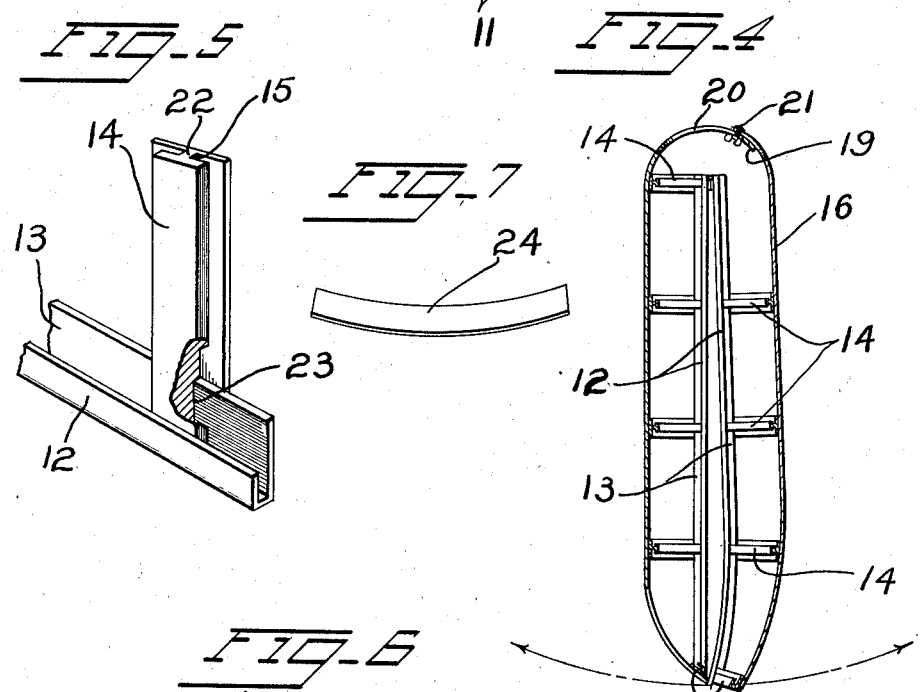
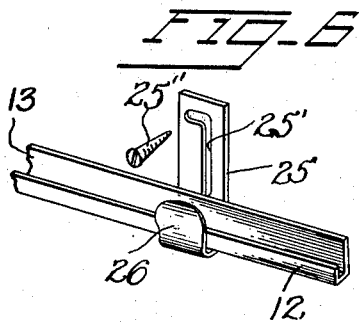
Inventor
D. D. Hall.
By Lacey & Lacey,
Attorneys Patented Apr. 30, 1940

2,198,727

UNITED STATES PATENT OFFICE 2,198,727

ADVERTISING RACK FOR TAXICABS AND OTHER CONVEYANCES

Dayle D. Hall, Jacksonville, Fla., assignor to Advertising Systems of America, Albany, Ga., a corporation of Georgia Application October 21, 1939, Serial No. 300,643

8 Claims. (Cl. 40—129)

This invention relates to advertising devices and more particularly to a card-supporting frame or rack for displaying advertising matter in taxicabs and other public conveyances.

The object of the invention is to provide a card-supporting rack of simple and inexpensive construction especially designed for attachment to the ceiling of a taxicab or other conveyance and by means of which advertising matter may be effectually displayed to advantage while the cab is in transit.

A further object of the invention is to provide a card-supporting rack including a frame curved to conform to the ceiling of a taxicab and provided with a plurality of independent compartments for the reception of removable display cards.

A further object is to construct the rack or frame of pivotally united sections so as to permit the sections to be folded one upon the other and thus facilitate positioning the rack within or removing said rack from a vehicle.

A further object is to provide a rack for displaying advertising matter which may be quickly positioned against the ceiling of any standard make of taxicab or other closed vehicle to either entirely or partially cover the same and which is not subjected to vibrations or rattling when the vehicle is traveling over rough uneven roads.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a longitudinal sectional view of a motor vehicle provided with my improved advertising rack, Figure 2 is a transverse sectional view taken on the line 2—2 of Figure 1, Figure 3 is a top plan view of the rack detached, Figure 4 is a vertical sectional view showing how the sections of the rack are folded to facilitate positioning the rack within or removing the rack from a vehicle, Figure 5 is a detail perspective view showing the manner of attaching the transverse H-bars to the channeled bars of the frame sections, Figure 6 is a detail perspective view of one of the resilient supporting clips for engagement with the frame sections, Figure 7 is a perspective view of one of the resilient retaining strips for the display cards, and Figure 8 is a top plan view showing the retaining strip in position on the rack and bearing against the adjacent display cards.

The improved advertising device forming the subject-matter of the present invention may be used in connection with any standard make of closed car, and by way of illustration is shown applied to a taxicab of conventional construction, in which 5 designates the body portion, 6 the top, 7 the ceiling and 8 one of the side doors.

The device comprises a substantially rectangular metallic frame, preferably formed in two sections 9 and 10, having their adjacent ends pivotally connected at 11 so as to permit said sections to be folded one upon the other to facilitate positioning the rack within the vehicle and against the ceiling thereof. The sections 9 and 10 are curved longitudinally and transversely to conform to the curvature of the ceiling 7 and the side bars 12 of said sections are substantially U-shaped in cross section to reinforce the same and provide channels 13 for the purpose hereinafter referred to. Each frame section is provided at spaced intervals with upwardly bowed transverse bars 14, preferably substantially H-shaped in cross section, to form oppositely disposed card-receiving grooves 15. Secured by spot welding or otherwise to the transverse bars 14 are a series of longitudinally disposed flexible metal bars or strips 16 defining intermediate compartments 17 for the reception of removable advertising cards, indicated at 18.

The inner ends of the longitudinal strips 16 are overlapped at 19 and provided with longitudinal slots 20 for the reception of set screws 21 so that by loosening the set screws 21 the sections 9 and 10 may be folded downwardly to the position shown in Figure 4 of the drawings so as to permit the rack to be readily introduced within the vehicle through one of the door openings thereof and positioned against the ceiling 7. The connecting webs 22 at the outer ends of the transverse bars 14 are cut-away to form recesses 23 which receive the adjacent edges of the side bars 12 and to which they are spot welded or otherwise rigidly secured, as best shown in Figure 5 of the drawings.

The display cards 18 conform to the shape of the compartments 7 and are inserted within the compartments by flexing the cards so that the edges thereof will enter the grooves 15 in the transverse bars 14, the intermediate portions of the outermost display cards being made of sufficient length to permit the cards to be bent to fit within the channels 13 of the side bars of the frame. In order to prevent buckling of the display cards within the compartments 17, I provide a plurality of bowed resilient retaining strips 24 which fit over the longitudinal strips at the junction of adjacent display cards with their opposite ends fitting in the grooves 15 of the transverse bars 14, as best shown in Figures 3 and 8 of the drawings.

The rack or frame may be detachably secured in position against the ceiling of the taxicab in any suitable manner as by screws or similar fastening devices but it is preferred to employ resilient supporting clips 25, the shanks of which are provided with bayonet slots 25' adapted to receive fastening screws 25" so as to permit limited vertical adjustment of the clips as best shown in Figure 6 of the drawings. The clips are secured to the interior of the taxicab adjacent the ceiling thereof and removably receive the side bars 12 of the frame sections. The free ends of the clips 25 are bent to form resilient hooks 26, the terminals of which are deflected laterally to permit easy entrance and removal of the side bars 12, said clips serving to frictionally engage the side bars and thus prevent vibration or rattling of the rack when the vehicle is traveling over rough uneven roads.

In positioning the rack within a taxicab or other conveyance, the set screws 21 are loosened and the sections 9 and 10 swung downwardly on the pivot pins 11 to the position shown in Figure 4 of the drawings, and in which position the rack may be readily introduced within the vehicle through one of the door openings thereof. The rack sections are then swung upwardly to extended position against the ceiling 7 and the screws 21 tightened, after which the side bars 12 of the rack sections are pressed downwardly within the spring clips 25 thereby securely but detachably supporting the rack in position within the taxicab. In order to remove the rack, it is merely necessary to loosen the set screws 21 and detach the side bars 12 from the supporting clips 25 when the rack sections may be swung downwardly to folded position in the manner previously stated. The display cards may be inserted in the compartments 7 either before or after the rack is positioned within the taxicab and said cards may be changed at will to permit the display of new advertising matter by merely removing the retaining strips 24 and flexing the cards until they are disengaged from the receiving channels, as will be readily understood. The pin and slot connection between the overlapped ends of the longitudinal strips 16 compensates for the movement of the rack sections when swung downwardly to folded position and the tightening of the screws when the sections are swung upwardly to operative position serves to prevent sagging of the rack sections so as not to detract from the interior appearance of the cab or other vehicle in which the rack is installed. The end bars 27 of the frame sections are also preferably U-shaped in cross section to provide receiving channels for the adjacent display cards.

A device constructed in accordance with the present invention not only serves effectually to display advertising matter to passengers riding in a taxicab but also enables the occupant or occupants of the cab to ascertain the location of hotels, business establishments and the like when traveling in a strange city.

It will, of course, be understood that the card-supporting racks may be constructed of any suitable material and made in different sizes and shapes according to the construction of the taxicab or other vehicle in which they are installed.

Having thus described the invention, what is claimed as new is:

1. The combination with a supporting wall, of a card-supporting rack conforming to and detachably engaging said wall, said rack being formed of pivotally united sections foldable one upon the other and each section provided with a plurality of compartments for the reception of advertising cards, bars extending longitudinally of the rack between the pivots of the sections and having their inner ends overlapped for sliding movement with respect to each other, and means for detachably securing the rack sections in extended position against said supporting wall.

2. The combination with a supporting wall, of a card-supporting rack comprising a sectional frame shaped to conform to and adapted to bear against the supporting wall intersecting longitudinal and transverse bars forming a part of each frame section and defining independent compartments for the reception of advertising cards, the longitudinal bars of the frame sections having their inner ends overlapped, a pin and slot connection between the overlapped ends of said longitudinal bars, and means for detachably securing said frame sections in position against said supporting wall.

3. The combination with a supporting surface, of supporting clips secured to said surface, a card-supporting rack including foldable companion sections detachably engaging the supporting clips, and a pin and slot connection between the intermediate portions of said foldable sections at the adjacent ends thereof.

4. The combination with a supporting wall, of a card-supporting rack shaped to conform to said wall, said rack comprising pivotally connected sections provided with intersecting transverse and longitudinal bars defining intermediate compartments for the reception of display cards, the inner ends of certain of the longitudinal bars being overlapped and free to slide one upon the other to permit folding the said sections, and means for detachably securing the frame sections in position against said supporting wall.

5. The combination with a supporting wall, of a card-supporting rack comprising pivotally connected sections, longitudinal and transverse bars forming a part of each section and defining independent card-receiving compartments, the transverse bars being substantially H-shaped in cross section to form grooves for the reception of the adjacent edges of the cards and the inner ends of certain of the longitudinal bars being overlapped and having sliding engagement with each other, and means for detachably securing the rack in position against said supporting wall.

6. The combination with a supporting wall, of a card-supporting rack comprising pivotally connected U-shaped frames having channels formed therein, transverse bars substantially H-shaped in cross section for the major portion of their lengths secured to the frame of each section and provided with intermediate webs defining oppositely disposed grooves for engagement with a display card, the webs at the outer ends of the transverse bars being cut-away to receive the edges of the adjacent U-shaped frames, longitudinal bars secured to the transverse bars and having their inner ends overlapped and slotted, fastening devices extending through the slots in the overlapped ends of the longitudinal bars, and means for supporting the rack in position against said wall.

7. A card-supporting rack for motor conveyances comprising foldable U-shaped frames having their inner ends pivotally united and their intermediate portions provided with intersecting longitudinal and transverse bars defining card-receiving compartments, the inner ends of the longitudinal bars being overlapped and having slidable engagement with each other and the transverse bars being provided with grooves for the reception of display cards, and bowed resilient retaining strips fitting over the longitudinal bars at the junction of adjacent display cards and having their opposite ends fitting in the adjacent grooves.

8. A card-supporting rack comprising pivotally connected foldable frame sections each consisting of side bars substantially U-shaped in cross section and connected by similarly shaped end bars, transverse bars substantially H-shaped in cross section for the major portion of their lengths secured to the side bars of each frame section and provided with card-receiving grooves, and longitudinal bars secured to the transverse bars and defining intermediate compartments for the reception of display cards, the inner ends of the longitudinal bars at one side of the pivotal connection between the frame sections being overlapped and slidably connected to permit said frame section to be swung downwardly to folded position.

DAYLE D. HALL.